(12) United States Patent
Wu et al.

(10) Patent No.: US 12,072,594 B2
(45) Date of Patent: Aug. 27, 2024

(54) DISPLAY PANEL AND ELECTRICAL TERMINAL

(71) Applicant: WUHAN CHINA STAR OPTOELECTRONICS TECHNOLOGY CO., LTD., Hubei (CN)

(72) Inventors: Zhilin Wu, Hubei (CN); Tao Ma, Hubei (CN); Dewei Song, Hubei (CN); Fei Ai, Hubei (CN)

(73) Assignee: WUHAN CHINA STAR OPTOELECTRONICS TECHNOLOGY CO., LTD., Hubei (CN)

( * ) Notice: Subject to any disclaimer, the term of this patent is extended or adjusted under 35 U.S.C. 154(b) by 0 days.

(21) Appl. No.: 17/607,852

(22) PCT Filed: Sep. 8, 2021

(86) PCT No.: PCT/CN2021/117176
§ 371 (c)(1),
(2) Date: Mar. 2, 2023

(87) PCT Pub. No.: WO2023/024165
PCT Pub. Date: Mar. 2, 2023

(65) Prior Publication Data
US 2024/0027859 A1    Jan. 25, 2024

(30) Foreign Application Priority Data
Aug. 25, 2021    (CN) .......................... 202110982780.4

(51) Int. Cl.
*G02F 1/1368*      (2006.01)
*G02F 1/1333*      (2006.01)
(Continued)

(52) U.S. Cl.
CPC .... *G02F 1/136295* (2021.01); *G02F 1/13338* (2013.01); *G02F 1/1343* (2013.01);
(Continued)

(58) Field of Classification Search
None
See application file for complete search history.

(56) References Cited

U.S. PATENT DOCUMENTS

| | | | |
|---|---|---|---|
| 2012/0092308 A1 | 4/2012 | Chiang et al. | |
| 2013/0105804 A1 | 5/2013 | Jung et al. | |

(Continued)

FOREIGN PATENT DOCUMENTS

| | | | |
|---|---|---|---|
| CN | 106201114 A | 12/2016 | |
| CN | 107610636 A | 1/2018 | |

(Continued)

OTHER PUBLICATIONS

Chinese Office Action issued in corresponding Chinese Patent Application No. 202110982780.4 dated Apr. 29, 2022, pp. 1-10.
(Continued)

*Primary Examiner* — Thanh Nhan P Nguyen
(74) *Attorney, Agent, or Firm* — PV IP PC; Wei Te Chung; Zhigang Ma

(57) ABSTRACT

The present application discloses a display panel and an electrical terminal. The display panel includes: an underlay; an array driver layer located on the underlay and including a gate electrode layer and a source and drain electrode layer; a signal line including an adaptor portion located in the non-display region, wherein the adaptor portion includes a first wire section disposed in a same layer with the gate electrode layer, a second wire section disposed in a same layer with the source and drain electrode layer, and a bridge portion electrically connected to the first wire section and the second wire section; wherein the first wire section, the
(Continued)

second wire section, and the bridge portion are disposed in different layers.

20 Claims, 13 Drawing Sheets

(51) Int. Cl.
 *G02F 1/1343* (2006.01)
 *G02F 1/1362* (2006.01)
(52) U.S. Cl.
 CPC .. *G02F 1/136209* (2013.01); *G02F 1/136227* (2013.01); *G02F 1/1368* (2013.01)

(56) References Cited

U.S. PATENT DOCUMENTS

| | | |
|---|---|---|
| 2013/0321680 A1 | 12/2013 | Kumano |
| 2018/0314120 A1 | 11/2018 | Peng |
| 2020/0176477 A1 | 6/2020 | Liu et al. |

FOREIGN PATENT DOCUMENTS

| | | |
|---|---|---|
| CN | 107611142 A | 1/2018 |
| CN | 109037235 A | 12/2018 |
| CN | 109521594 A | 3/2019 |
| CN | 110047847 A | 7/2019 |
| CN | 110148599 A | 8/2019 |
| CN | 209843713 U | 12/2019 |
| CN | 111665670 A | 9/2020 |
| CN | 111736398 A | 10/2020 |
| CN | 112289841 A | 1/2021 |

OTHER PUBLICATIONS

International Search Report in International application No. PCT/CN2021/117176, mailed on Mar. 28, 2022.
Written Opinion of the International Searching Authority in International application No. PCT/CN2021/117176, mailed on Mar. 28, 2022.

DISPLAY PANEL AND ELECTRICAL TERMINAL

RELATED APPLICATIONS

This application is a Notional Phase of PCT Patent Application No. PCT/CN2021/117176 having international filing date of Sep. 8, 2021, which claims the benefit of priority of Chinese Patent Application No. 202110982780.4 filed on Aug. 25, 2021. The contents of the above applications are all incorporated by reference as if fully set forth herein in their entirety.

FIELD OF INVENTION

The present application relates to a field of displays, especially to a display panel and an electrical terminal.

BACKGROUND OF INVENTION

Liquid crystal display (LCD) and other flat display devices are widely used in various consumer electronic products such as mobile phones, TVs, personal digital assistants, digital cameras, laptops, and desktops due to their advantages of high image quality, power saving, thin body and wide application range, and have become the mainstream of display devices. LCD has two display technologies of amorphous silicon (A-Si) thin film transistor/low temperature poly-silicon, low-temperature polycrystalline silicon (LTPS) thin film transistor. The LTPS thin film transistor has an advantage of high mobility and is extensively used in display panel technologies of high specifications.

The LTPS thin film transistor is limited by a high temperature process, for example, 600 Celsius degrees is needed. In industries a molybdenum (Mo) metal is used most. However, an impedance of the Mo metal is higher and disadvantages product requirements of a high charge rate of middle size products with high resolution and high frequency. A metal material with high temperature resistance and low electrical resistance can be used to replace the Mo metal to lower a resistivity of the material to improve a performance such as the charge rate.

At present, in a process of forming via holes in a source and drain electrode layer and a semiconductor layer of a LTPS thin film transistor display product, hydrofluoric acid (HF) is used to remove an oxide layer in a contact hole of an insulation layer (ILD) to improve electrical characteristics, while a metal in an adaptor hole of a non-display region is also processed. The metal employs a metal material with high temperature resistance and low electrical resistance. Because the metal material with high temperature resistance and low electrical resistance is vulnerable to hydrofluoric acid, it is corroded easily and results in a great amount of loss the metal inside the adaptor hole and causes increase of the contact impedance of the adaptor hole, which influences performance and quality of display panel products.

SUMMARY OF INVENTION

Technical Issue

The present application provides a display panel and an electrical terminal to mitigate the technical issue that a metal in an adaptor hole of a conventional display panel has an increased contact impedance of the adaptor hole due to etching.

Technical Solution

The present application provides a display panel, wherein the display panel comprises a display region and a non-display region located on a periphery of the display region; wherein the display panel comprises:
  an underlay;
    an array driver layer located on the underlay and comprising a gate electrode layer and a source and drain electrode layer; and
    a signal line comprising an adaptor portion located in the non-display region, wherein the adaptor portion comprises a first wire section disposed in a same layer with the gate electrode layer, a second wire section disposed in a same layer with the source and drain electrode laye, and a bridge portion electrically connected to the first wire section and the second wire section;
    wherein the first wire section, the second wire section, and the bridge portion are disposed in different layer.

In the display panel of the present application, the display panel further comprises metal layers located on two sides of the array driver layer, and the bridge portion and at least one of the metal layers are disposed in a same layer.

In the display panel of the present application, the display panel comprises a light shielding layer located between the underlay and the array driver layer, the bridge portion and the light shielding layer are disposed in a same layer, the interlayer insulation layer between the first wire section and the second wire section completely covers the first wire section, and an ability of hydrofluoric acid corrosion resistance of the light shielding layer is greater than an ability of hydrofluoric acid corrosion resistance of the gate electrode layer.

In the display panel of the present application, the display panel comprises a first electrode layer located on the array driver layer, and the first electrode layer is electrically connected to the source and drain electrode layer;
  wherein the bridge portion and the first electrode layer are disposed in same layer.

In the display panel of the present application, the display panel comprises a first electrode layer located on the array driver layer and a second electrode layer located between the array driver layer and the first electrode layer, the first electrode layer is electrically connected to the source and drain electrode layer, and the first electrode layer is insulated from the second electrode layer;
  wherein the bridge portion and the second electrode layer are disposed in a same layer.

In the display panel of the present application, the display panel comprises a first electrode layer located on the array driver layer, a second electrode layer located between the array driver layer and the first electrode layer, and a touch wiring layer located between the array driver layer and the second electrode layer, the first electrode layer is electrically connected to the source and drain electrode layer, the first electrode layer is insulated from the second electrode layer, and the touch wiring layer is electrically connected to the second electrode layer;
  wherein the bridge portion and the touch wiring layer are disposed in a same layer.

In the display panel of the present application, the adaptor portion further comprises a first via hole and a second via hole, the first wire section is electrically connected to the bridge portion through a connection metal in the first via hole, and the second wire section is electrically connected to the bridge portion through a connection metal in the second via hole; and the array driver layer further comprises a semiconductor layer, the source and drain electrode layer of the array driver layer is electrically connected to the semiconductor layer through a connection metal in a third via hole, a contact impedance of the connection metal in the third via hole is greater than a contact impedance of the connection metal in the first via hole or the connection metal in the second via hole.

In the display panel of the present application, the adaptor portion comprises at least two first via holes and at least two second via holes, the at least two first via holes are connected in parallel, the at least two second via holes are connected in parallel.

In the display panel of the present application, a material of the first wire section comprises an alloy material or a lamination metal film multi-layer.

In the display panel of the present application, the alloy material comprises aluminum alloy, tungsten alloy, copper alloy, silver alloy, and zinc alloy, and the lamination metal film multi-layer comprises an aluminum lamination layer, a tungsten lamination layer, a copper lamination layer, a silver lamination layer, and a zinc lamination layer.

The embodiment of the present application also provides an electrical terminal, comprising a display panel and a terminal main body, the display panel is installed in the terminal main body; the display panel comprising a display region and a non-display region located on a periphery of the display region; wherein the display panel comprises:

an underlay;

an array driver layer located on the underlay and comprising a gate electrode layer and a source and drain electrode layer; and a signal line comprising an adaptor portion located in the non-display region, wherein the adaptor portion comprises a first wire section disposed in a same layer with the gate electrode layer, a second wire section disposed in a same layer with the source and drain electrode laye, and a bridge portion electrically connected to the first wire section and the second wire section;

wherein the first wire section, the second wire section, and the bridge portion are disposed in different layers.

In the electrical terminal of the present application, the display panel further comprises metal layers located on two sides of the array driver layer, and the bridge portion and at least one of the metal layers are disposed in a same layer.

In the electrical terminal of the present application, the display panel comprises a light shielding layer located between the underlay and the array driver layer, the bridge portion and the light shielding layer are disposed in a same layer, the interlayer insulation layer between the first wire section and the second wire section completely covers the first wire section, and an ability of hydrofluoric acid corrosion resistance of the light shielding layer is greater than an ability of hydrofluoric acid corrosion resistance of the gate electrode layer.

In the electrical terminal of the present application, the display panel comprises a first electrode layer located on the array driver layer, and the first electrode layer is electrically connected to the source and drain electrode layer;

wherein the bridge portion and the first electrode layer are disposed in same layer.

In the electrical terminal of the present application, the display panel comprises a first electrode layer located on the array driver layer and a second electrode layer located between the array driver layer and the first electrode layer, the first electrode layer is electrically connected to the source and drain electrode layer, and the first electrode layer is insulated from the second electrode layer;

wherein the bridge portion and the second electrode layer are disposed in a same layer.

In the electrical terminal of the present application, the display panel comprises a first electrode layer located on the array driver layer, a second electrode layer located between the array driver layer and the first electrode layer, and a touch wiring layer located between the array driver layer and the second electrode layer, the first electrode layer is electrically connected to the source and drain electrode layer, the first electrode layer is insulated from the second electrode layer, and the touch wiring layer is electrically connected to the second electrode layer;

wherein the bridge portion and the touch wiring layer are disposed in a same layer.

In the electrical terminal of the present application, the adaptor portion further comprises a first via hole and a second via hole, the first wire section is electrically connected to the bridge portion through a connection metal in the first via hole, and the second wire section is electrically connected to the bridge portion through a connection metal in the second via hole; and the array driver layer further comprises a semiconductor layer, the source and drain electrode layer of the array driver layer is electrically connected to the semiconductor layer through a connection metal in a third via hole, a contact impedance of the connection metal in the third via hole is greater than a contact impedance of the connection metal in the first via hole or the connection metal in the second via holes.

In the electrical terminal of the present application, the adaptor portion comprises at least two first via holes and at least two second via holes, the at least two first via holes are connected in parallel, the at least two second via holes are connected in parallel.

In the electrical terminal of the present application, a material of the first wire section comprises an alloy material or a lamination metal film multi-layer.

In the electrical terminal of the present application, the alloy material comprises aluminum alloy, tungsten alloy, copper alloy, silver alloy, and zinc alloy, and the lamination metal film multi-layer comprises an aluminum lamination layer, a tungsten lamination layer, a copper lamination layer, a silver lamination layer, and a zinc lamination layer.

Advantages

The present application provides a display panel and an electrical terminal. The display panel comprises a display region and a non-display region located on a periphery of the display region; wherein the display panel comprises: an underlay; an array driver layer located on the underlay and comprising a gate electrode layer and a source and drain electrode layer; and a signal line comprising an adaptor portion located in the non-display region, wherein the adaptor portion comprises a first wire section disposed in a same layer with the gate electrode layer, a second wire section disposed in a same layer with the source and drain electrode layer, and a bridge portion electrically connected to the first wire section and the second wire section; wherein the first wire section, the second wire section, and the bridge portion are disposed in different layers. The embodiment of the present application disposes a bridge portion electrically connected to the first wire section and the second wire section a different layer in the non-display region to prevent etching the first wire section when an adaptor hole of the adaptor portion is formed, which avoids increase of an impedance of the first wire section and a contact impedance between the first wire section and the second wire section, improves accuracy of data transmission of signal lines, and improves a performance of products of the display panel.

DESCRIPTION OF DRAWINGS

To more clearly elaborate on the technical solutions of embodiments of the present invention or prior art, appended figures necessary for describing the embodiments of the present invention or prior art will be briefly introduced as follows. Apparently, the following appended figures are merely some embodiments of the present invention. A person of ordinary skill in the art may acquire other figures according to the appended figures without any creative effort.

Specific embodiments of the present invention are described in details with accompanying drawings as follows to make technical solutions and advantages of the present invention clear.

DETAILED DESCRIPTION OF PREFERRED EMBODIMENTS

Figure 1:
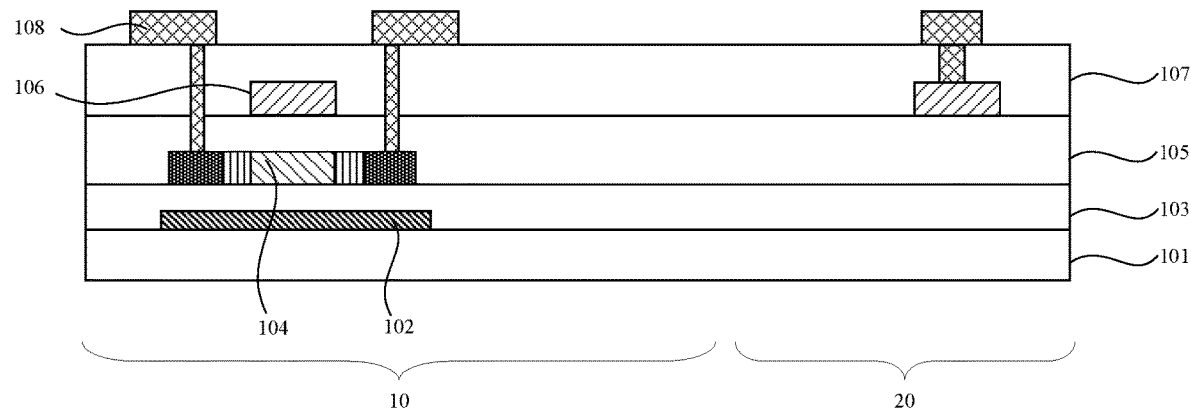
FIG. 1 is a schematic manufacturing process structural view of a conventional display panel.

The technical solution in the embodiment of the present application will be clearly and completely described below with reference to the accompanying drawings in the embodiments of the present application. Apparently, the described embodiments are merely some embodiments of the present application instead of all embodiments. According to the embodiments in the present application, all other embodiments obtained by those skilled in the art without making any creative effort shall fall within the protection scope of the present application.

In the description of the present application, it should be understood that terminologies "center", "longitudinal", "transverse", "length", "width", "thickness", "upper", "lower", "front", "rear", "left", "side", "vertical", "horizontal", "top", "bottom", "inner", "outer", "clockwise", "counterclockwise" for indicating relations of orientation or position are based on orientation or position of the accompanying drawings, are only for the purposes of facilitating description of the present application and simplifying the description instead of indicating or implying that the referred device or element must have a specific orientation or position, must to be structured and operated with the specific orientation or position. Therefore, they should not be understood as limitations to the present application. Furthermore, terminologies "first", "second" are only for the purposes of description, and cannot be understood as indication or implication of comparative importance or a number of technical features. Therefore, a feature limited with "first", "second" can expressly or implicitly include one or more features. In the description of the present application, a meaning of "a plurality of" is two or more, unless there is a clear and specific limitation otherwise.

In the description of the present application, it should be noted that unless clear rules and limitations otherwise exist, terminologies "install", "connect", "connection" should be understood in a broad sense. For instance, the connection can be a fixed connection, a detachable connection or an integral connection. The connection can be a mechanical connection, an electrical connection or a telecommunication. The connection can be a direct connection, an indirect connection through an intermedium, can be an internal communication between two elements or an interaction between the two elements. For a person of ordinary skill in the art, the specific meaning of the above terminology in the present application can be understood on a case-by-case basis.

In the present application, it should be noted that unless clear rules and limitations otherwise exist, words "a first feature is "on" or "under" a second feature" can include a direct contact of the first and second features, can also include a contact of the first and second features through another feature therebetween instead of a direct contact. Furthermore, words "the first feature is "above" or "over" the second feature include that the first feature is right above or obliquely above the second feature, or only indicate that a level of the first feature is higher that of the second feature. Words "the first feature is "under" or "below" the second feature include that the first feature is right under or obliquely under the second feature, or only indicate that the level of the first feature is lower than that of the second feature.

The following disclosure provides many different embodiments or examples to achieve different structures of the present application. To simplify the disclosure of the present application, the components and arrangements of the specific examples are described below. Of course, they are merely examples, and the purpose is not to limit the present application. Furthermore, the present application may repeat reference numerals and/or reference letters in different examples. The repetition is for the purpose of simplification and clarity, and does not by itself indicate the relationship between the various embodiments and/or settings discussed. In addition, the present application provides examples of various specific processes and materials, but a person of ordinary skill in the art can be aware of the application of other processes and/or the use of other materials.

In a conventional technology, with reference to FIG. 1, FIG. 1 shows a display structure of a process for manufacturing a display product of a LTPS thin film transistor provided by the present application. The display structure comprises a display region 10 and a non-display region 20. The display region 10 of the display structure comprises an underlay 101, a light shielding layer 102, a first insulation layer 103, a semiconductor layer 104, a second insulation layer 105, a gate electrode layer 106, a third insulation layer 107, and a source and drain electrode layer 108 sequentially stacked on one another. The non-display region 20 of the display structure comprises the underlay 101, the first insulation layer 103, the second insulation layer 105, the gate electrode layer 106, the third insulation layer 107, and the source and drain electrode layer 108 sequentially stacked on one another.

Before the source and drain electrode layer 108 is formed, in the process forming contact holes of the source and drain electrode layer 108 (also called SD) and the semiconductor layer 104 (including Poly), hydrofluoric acid is used to remove an oxide layer in the contact hole, for example, the oxide layer of the contact hole in the third insulation layer 107 is removed to obtain excellent SD-Poly to improve electrical characteristics. When the hydrofluoric acid is used to etch the contact hole of the display region 10, the adaptor holes of the non-display region 20 are also etched. However, because the gate electrode layer 106 of the non-display region 20 and the semiconductor layer 104 of the display region 10 are not located in the same layer, after the adaptor holes of the non-display region 20 are completely etched, the gate electrode layer 106 in the adaptor holes is etched subsequently. The gate electrode layer 106 is a Mo metal, an impedance of the Mo metal is greater. However, a high charge rate of middle size products with high resolution and high frequency strongly requires a low resistance metal. When the Mo metal is replaced with a metal material with high temperature resistance and low electrical resistance, because the metal material with high temperature resistance and low electrical resistance is vulnerable to hydrofluoric acid, it is easily corroded by hydrofluoric acid and results in a great amount of loss the metal I with high temperature resistance and low electrical resistance inside the adaptor hole and causes increase of the contact impedance of the adaptor hole, which influences performance and quality of display panel products.

The present application provides the following technical solutions to solve the above technical issue.

With reference to FIG. 2s, 8, 14, and 18, the present application provides a display panel 1000 comprising a display region 10 and the non-display region 20.

The display panel 1000 comprises an underlay 101 and an array driver layer 100 located on the underlay 101.

The underlay 101 can be a rigid substrate, and can be a flexible substrate. A material for manufacturing the underlay 101 comprises glass, quartz, or polyimide.

The array driver layer 100 comprises a semiconductor layer 104, a second insulation layer 105, a gate electrode layer 106, a third insulation layer 107, and a source and drain electrode layer 108 sequentially stacked on one another. The semiconductor layer 104 is a polycrystalline silicon layer formed by patterning, and is disposed on a side of the underlay 101. The second insulation layer 105 is disposed on the semiconductor layer 104, and the second insulation layer 105 can be also called gate electrode insulation layer (GI). The second insulation layer 105 can be made of materials such as silicon oxide ($SiO_x$), silicon nitride ($SiN_x$), or silicon oxynitride ($SiN_xO_y$). The gate electrode layer 106 is disposed on the second insulation layer 105, and the gate electrode layer 106 is formed by patterning. A material of the gate electrode layer 106 is a metal material with high temperature resistance and low electrical resistance and comprises a alloy material or a lamination metal film multi-layer, for example, an alloy material such as aluminum alloy, tungsten alloy, copper alloy, silver alloy or zinc alloy, a metal film multi-layer such as an aluminum lamination layer, a tungsten lamination layer, a copper lamination layer, a silver lamination layer, or a zinc lamination layer, and a metal material such as aluminum, tungsten, copper, silver, or zinc. The third insulation layer 107 is disposed on the gate electrode layer 106 and the second insulation layer 105. The third insulation layer 107 can also be called interlayer insulation layer (ILD). The source and drain electrode layer 108 is disposed on the third insulation layer 107, and is formed by patterning. The source and drain electrode layer 108 is electrically connected the semiconductor layer 104 through a contact hole.

The display panel 1000 further comprises a signal line, the signal line comprises an adaptor portion 120 located in the non-display region 20. The adaptor portion 120 comprises a first wire section 121 disposed in a same layer with the gate electrode layer 106, a second wire section 122 disposed in a same layer with the source and drain electrode layer 108, and a bridge portion 123 electrically connected to the first wire section 121 and the second wire section 122. wherein the first wire section 121, the second wire section 122 and the bridge portion 123 are disposed in different layers. A material of the first wire section is a metal material with high temperature resistance and low electrical resistance and comprises an alloy material or a lamination metal film multi-layer, an alloy material such as aluminum alloy, tungsten alloy, copper alloy, silver alloy, or zinc alloy, a metal film multi-layer such as an aluminum lamination layer, a tungsten lamination layer, a copper lamination layer, a silver lamination layer, or a zinc lamination layer, and a metal material such as aluminum, tungsten, copper, silver, or zinc.

The present application disposes the bridge portion 123 electrically connected to the first wire section 121 and the second wire section 122 in a different layer in the non-display region 20 to prevent over etching of the first wire section 121 and the second wire section 122 when the adaptor holes of the adaptor portion 120 are formed, which prevents increase of the impedance of the first wire section 121 and the contact impedance between the first wire section 121 and the second wire section 122 and improves accuracy of data transmission of signal lines, and improves a performance of products of the display panel.

In an embodiment, the display panel 1000 further comprises metal layers located on two sides of the array driver layer 100 respectively. The bridge portion 123 and at least one of the metal layers are disposed in a same layer to achieve electrical connection between the first wire section 121 and the second wire section 122. The bridge portion 123 and at least one of the metal layers are disposed in a same layer such that the bridge portion 123 and a corresponding metal layer can be formed in a same process.

Figure 2:
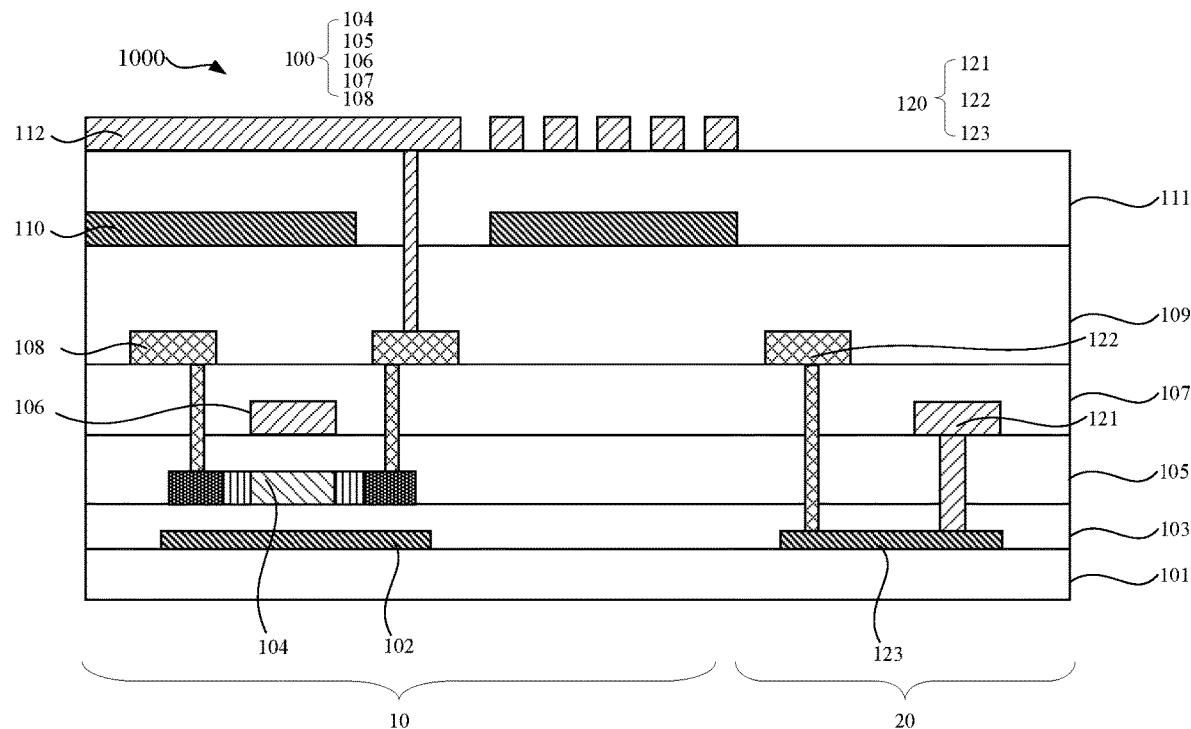
FIG. 2 is a first structural view of the display panel provided by the embodiment of the present application.

In an embodiment, with reference to FIG. 2, the display panel 1000 comprises the light shielding layer 102 (metal layer) located between the underlay 101 and the array driver layer 100. The third insulation layer 107 (interlayer insulation layer) between the first wire section 121 and the second wire section 122 completely covers the first wire section 121. The bridge portion 123 and the light shielding layer 102 located on the non-display region 20 are disposed in a same layer. The bridge portion 123 is disposed under the adaptor hole. The bridge portion 123 is formed by a process for manufacturing the light shielding layer 102. Alternatively, it can be comprehended that when the light shielding layer 102 is manufactured, a corresponding light shielding layer is also formed in in the non-display region 20 (below the adaptor hole), and the light shielding layer formed in the non-display region 20 serves as the bridge portion 123. In the embodiment, the light shielding layer formed in the non-display region 20 serves as the bridge portion 123 such that the bridge portion 123 is formed by the process manufacturing the light shielding layer 102 to achieve connection between the first wire section 121 and the second wire section 122 through the light shielding layer (the bridge portion 123). A material of the light shielding layer 102 (the bridge portion 123) for example can be molybdenum aluminum alloy, a chromium metal, a molybdenum metal, tungsten, tungsten alloy or other material simultaneously including light shielding function Q conductive characteristic. An ability of hydrofluoric acid corrosion resistance of the light shielding layer 102 is stronger than an ability of hydrofluoric acid corrosion resistance of the gate electrode layer 106. As such, even processed in a corresponding process with hydrofluoric acid, an amount corroded loss of the light shielding layer 102 (the bridge portion 123) would be reduced.

The adaptor portion 120 further comprises a first via hole and a second via hole, the first via hole and the second via hole are adaptor holes. The first wire section 121 is electrically connected to the bridge portion 123 through the first via hole. The second wire section 122 is electrically connected to the bridge portion 123 through the second via hole.

Specifically, with reference to FIG. 2, the display panel 1000 comprises the underlay 101, the light shielding layer 102, the first insulation layer 103, the semiconductor layer 104, the second insulation layer 105, the gate electrode layer 106, the third insulation layer 107, the source and drain electrode layer 108, a fourth insulation layer 109, a second electrode layer 110, a fifth insulation layer 111, and a first electrode layer 112 sequentially stacked on one another.

The light shielding layer 102 (the bridge portion 123) is disposed on the underlay 101. The first insulation layer 103 is disposed on the underlay 101 and the light shielding layer 102 (the bridge portion 123). The first insulation layer 103 can be a buffer layer, and can be other film layer performing an insulating function. The semiconductor layer 104 is disposed on the first insulation layer 103. the second insulation layer 105 is disposed on the semiconductor layer 104 and the first insulation layer 103. The semiconductor layer 104, the second insulation layer 105, the gate electrode layer 106, the third insulation layer 107, and the source and drain electrode layer 108 refer to the descriptions as above, and are not repeatedly described here. The fourth insulation layer 109 is formed on the third insulation layer 107 and the source and drain electrode layer 108, and the fourth insulation layer 109 can be also called planarization layer (PLN). A material of the fourth insulation layer 109 is an organic material. The second electrode layer (BITO) 110 is formed on the fourth insulation layer 109. The fifth insulation layer 111 is formed on the second electrode layer 110 and the fourth insulation layer 109. The fifth insulation layer 111 can be also called passivation layer (PV) or insulative protective layer. The first electrode layer (TITO) 112 is formed on the fifth insulation layer 111, and is electrically connected to the source and drain electrode layer 108 through the via hole.

In some embodiments, the display panel 1000 can only have the first electrode layer, for example the first electrode layer 112. For example, the first electrode layer 112 is disposed on the fourth insulation layer 109 of the display panel 1000, and the embodiment is not shown in the figures.

Figure 7:
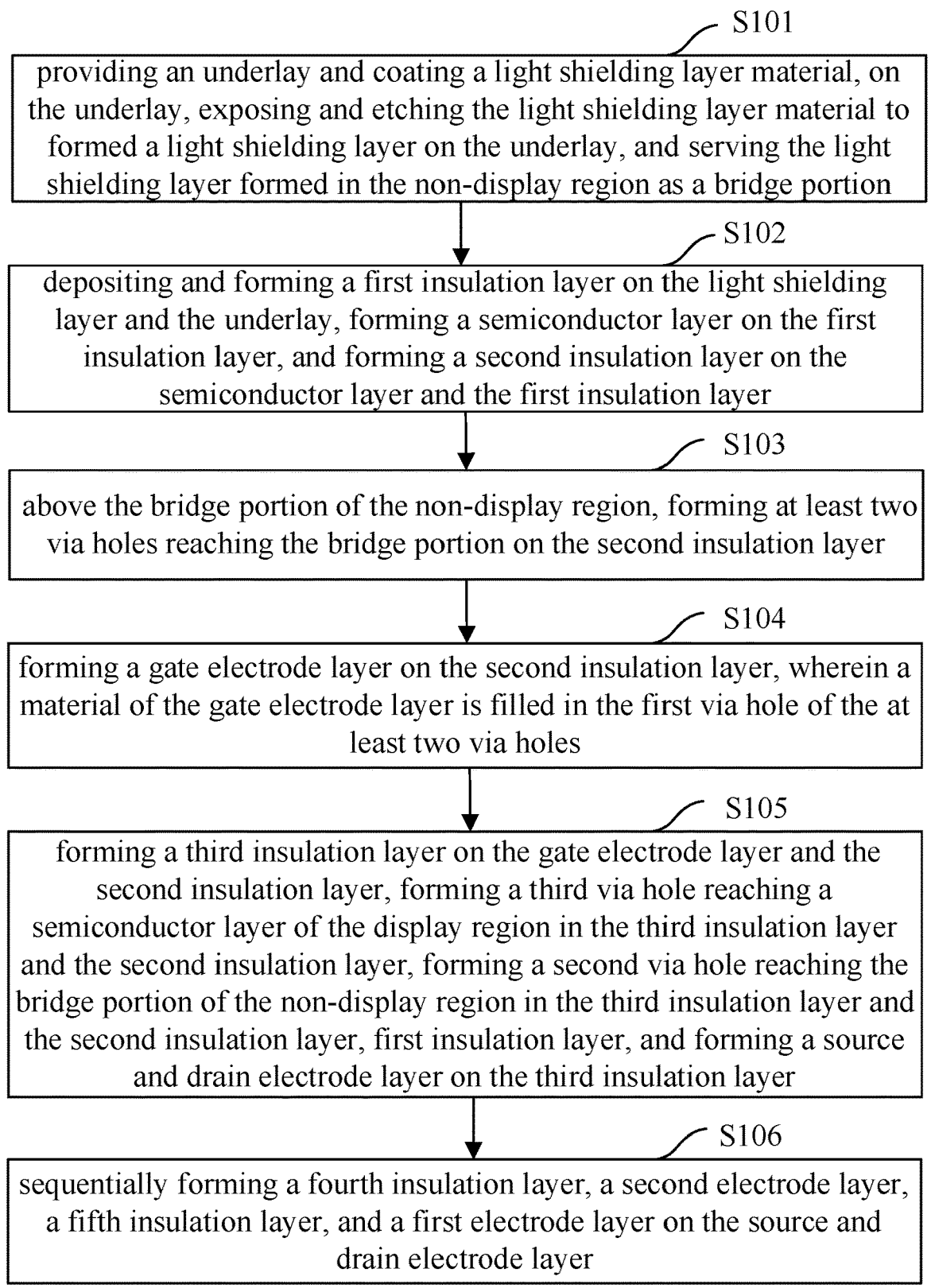
FIG. 7 is a first flow chart of a manufacturing method of the display panel provided by the embodiment of the present application.

FIG. 7 is a flow chart of a manufacturing method of the display panel provided by the embodiment of the present application. The display panel manufacturing method is configured to manufacture the display panel as shown in FIG. 2. display panel manufacturing method comprises steps as follows.

A step S101 comprises providing an underlay and coating a light shielding layer material, on the underlay, exposing and etching the light shielding layer material to form a light shielding layer on the underlay, and serving the light shielding layer formed in the non-display region as a bridge portion.

Figure 3:
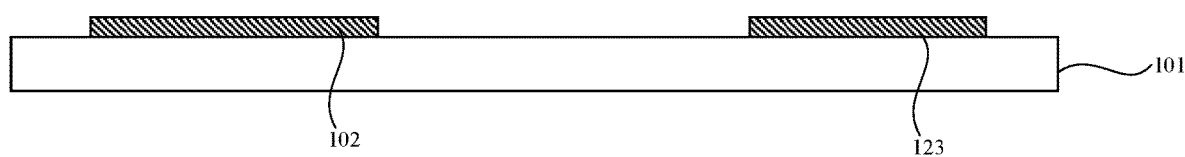
FIGS. 3 to 6 are schematic structural views of a first manufacturing process of the display panel provided by the embodiment of the present application.

A light shielding layer material is coated on the entire underlay 101, the light shielding layer material is exposed and etched. A mask for exposure and etching is different from a conventional mask, and has a corresponding pattern in the non-display region. After exposure and etching, a patterned light shielding layer is formed on the underlay 101. With reference to FIG. 3, the corresponding light shielding layer 102 is formed on the underlay in the display region, the light shielding layer 102 also exists on the underlay in the non-display region. The light shielding layer 102 of the non-display region serves as the bridge portion 123 subsequently.

A step S102 comprises depositing and forming a first insulation layer on the light shielding layer and the underlay, forming a semiconductor layer on the first insulation layer, and forming a second insulation layer on the semiconductor layer and the first insulation layer.

Figure 4:
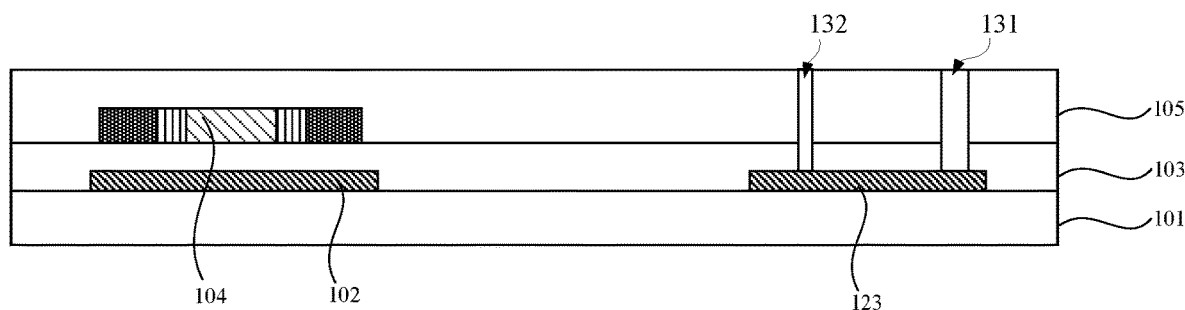

A material employed by the semiconductor layer comprises low-temperature polycrystalline silicon, the low-temperature polycrystalline silicon is laser-annealed and then is patterned to form a Poly-Si pattern of the semiconductor layer 104, specifically with reference to FIG. 4. The second insulation layer 105 is formed on the semiconductor layer 104 and the first insulation layer 103.

A step S103 comprises above the bridge portion of the non-display region, forming at least two via holes reaching the bridge portion on the second insulation layer.

With reference to FIG. 4, above the bridge portion 123 of the non-display region 20, at least two via holes reaching the light shielding layer are formed in the second insulation layer 105 and can be the first via hole 131 and the second via hole 132.

A step S104 comprises forming a gate electrode layer on the second insulation layer, wherein a material of the gate electrode layer is filled in the first via hole of the at least two via holes.

Figure 5:
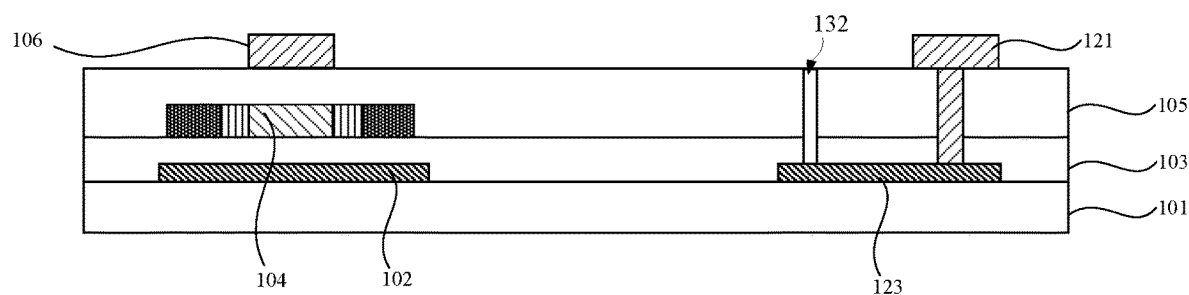

A first metal material is coated on the second insulation layer 105 to form a first metal layer, the first metal layer is photomasked, etched, and developed. The first metal material is a conductive metal material with high temperature resistance and low electrical resistance and comprises an alloy material or a lamination metal film multi-layer, for example, the alloy material such as aluminum alloy, tungsten alloy, copper alloy, silver alloy, or zinc alloy, a metal film multi-layer such as aluminum lamination layer, tungsten lamination layer, copper lamination layer, silver lamination layer, or zinc lamination layer, and the metal material such as aluminum, tungsten, copper, silver, or zinc. With reference to FIG. 5, after photomasking, etching and developing, the gate electrode layer 106 is formed. The gate electrode layer 106 is filled in the first via holes 131. Because the first wire section is formed in the process forming the gate electrode layer 106, accordingly, the material of the first wire section 121 is consistent with the first metal material.

A step S105 comprises forming a third insulation layer on the gate electrode layer and the second insulation layer, forming a third via hole reaching a semiconductor layer of the display region in the third insulation layer and the second insulation layer, forming a second via hole reaching the bridge portion of the non-display region in the third insulation layer and the second insulation layer, first insulation layer, and forming a source and drain electrode layer on the third insulation layer.

Figure 6:
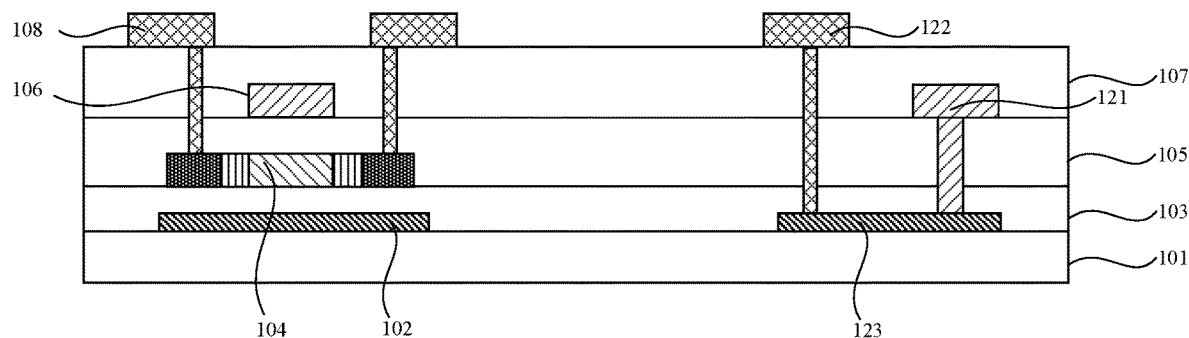

With reference to FIG. 6, the third insulation layer 107 is formed on the gate electrode layer 106 and the second insulation layer 105, and the third via hole reaching the semiconductor layer 104 of the display region 10 is formed in the third insulation layer 107 and the second insulation layer 105. Furthermore, the second via hole reaching the bridge portion 123 of the non-display region 20 is formed in the third insulation layer 107, the second insulation layer 105, and the first insulation layer 103, and the source and drain electrode layer 108 is formed on the third insulation layer 107. When the source and drain electrode layer 108 is formed, a second metal material is coated on the third insulation layer 107 to form a second metal layer, and the second metal layer is photomasked, etched and developed to form the source and drain electrode layer 108 after mask, etching and developing. The second metal material is filled in the third via hole reaching the semiconductor layer 104 of the display region 10 and filled in the second via hole reaching the bridge portion 123 of the non-display region 20.

As such, with reference to FIG. 6, the adaptor portion 120 is formed in the non-display region 20. The adaptor portion comprises, in the non-display region 20, the first wire section 121 formed in the process forming the gate electrode layer 106 and the second wire section 122 formed in the process forming the source and drain electrode layer 108. The first wire section 121 and the second wire section 122 are electrically connected to each other through the light shielding layer (the bridge portion 123) in the non-display region 20. The third insulation layer 107 (interlayer insulation layer) between the first wire section 121 and the second wire section 122 completely covers the first wire section 121.

It should be noted that the bridge portion 123 is used to electrically connect the first wire section 121 and the second wire section 122, which is equivalent to changing lines through two adaptor holes, increase of the adaptor holes further raises the contact impedance of the line changing. However, replacing the material of the gate electrode layer 106 with the first metal material can offset the increased contact impedance of line changing due to the increased adaptor holes and can also prevent an over-etching issue of the first wire section 121. Furthermore, disposing the at least two via holes (adaptor hole) makes a total impedance of the gate electrode layer 106, and the via holes also improve the charge rate.

A step S106 comprises sequentially forming a fourth insulation layer, a second electrode layer, a fifth insulation layer, and a first electrode layer on the source and drain electrode layer.

The fourth insulation layer 109, the second electrode layer 110, the fifth insulation layer 111, and the first electrode layer 112 are sequentially formed on the source and drain electrode layer 108. The formed display panel is as shown in FIG. 2. Specifically, a method forming the fourth insulation layer 109, the second electrode layer 110, the fifth insulation layer 111, and the first electrode layer 112 refer to conventional embodiments and are not repeated described here.

The display panel manufacturing method forms the display panel as shown in FIG. 2. The display panel formed by the display panel manufacturing method serves the light shielding layer in the non-display region 20 as the bridge portion 123 and connects the first wire section 121 and the second wire section 122 through the bridge portion 123 to prevent over etching of the first wire section 121 when the adaptor hole of the adaptor portion 120 is formed, which prevents increase of the impedance of the first wire section 121 and the contact impedance between the first wire section 121 and the second wire section 122 and improves accuracy of data transmission of signal lines, and improves a performance of products of the display panel.

Figure 8:
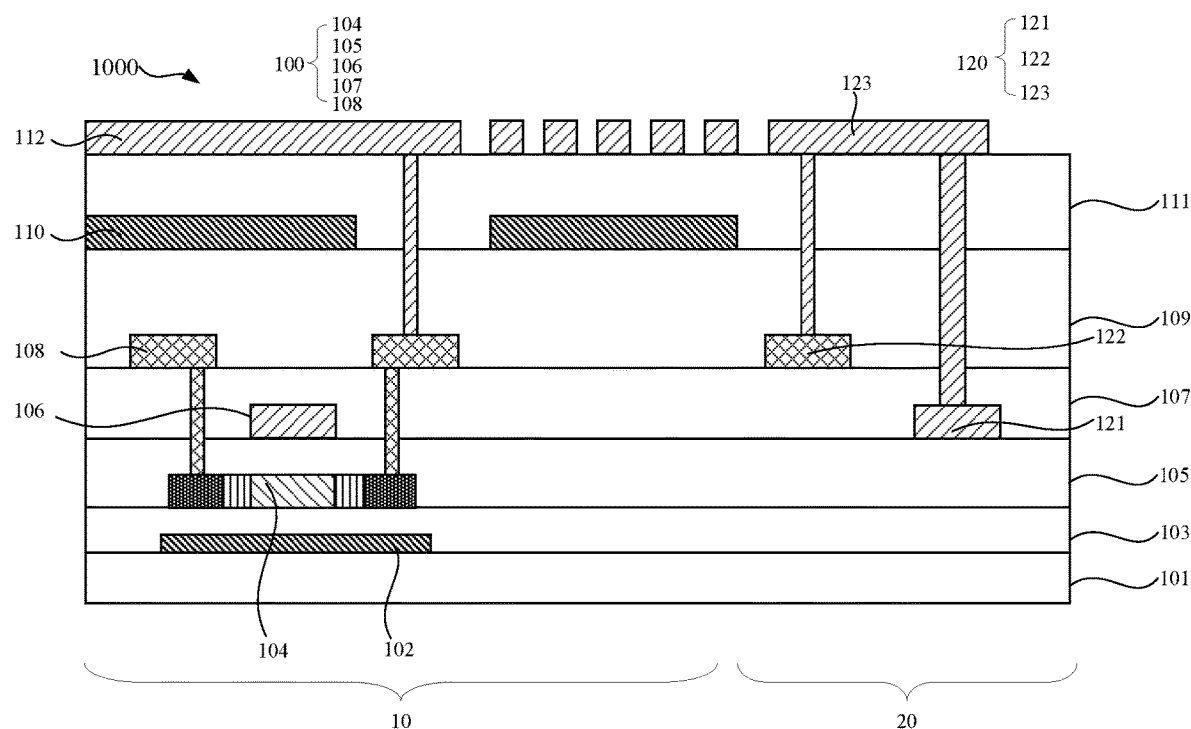
FIG. 8 is a second structural view of the display panel provided by the embodiment of the present application.

In an embodiment, with reference to FIG. 8 the, the display panel 1000 comprises the first electrode layer 112 located on the array driver layer 100. The first electrode layer 112 is electrically connected to the source and drain electrode layer 108 on the array driver layer 100. The bridge portion 123 and the first electrode layer 112 are disposed in a same layer. The bridge portion 123 is formed by the process manufacturing the first electrode layer 112. Alternatively, it can be comprehended that when the first electrode layer 112 is manufactured, in the non-display region 20, the first electrode is formed (above the adaptor holes), the formed first electrode serves as the bridge portion 123. In the embodiment, the first electrode formed (above the adaptor holes) serves as the bridge portion 123 such that the bridge portion 123 is formed by the process manufacturing the first electrode layer 112 to achieve electrical connection between the first wire section 121 and the second wire section 122 through the first electrode (the bridge portion 123) formed above the adaptor holes. Specifically, the first wire section 121 is electrically connected to the bridge portion 123 through the first via hole, and the second wire section 122 is electrically connected to the bridge portion 123 through the second via hole.

Specifically, with reference to FIG. 8, the display panel 1000 comprises the underlay 101, the light shielding layer 102, the first insulation layer 103, the semiconductor layer 104, the second insulation layer 105, the gate electrode layer 106, the third insulation layer 107, the source and drain electrode layer 108, the fourth insulation layer 109, the second electrode layer 110, the fifth insulation layer 111, and the first electrode layer 112 that are sequentially stacked on one another.

In an embodiment, the display panel 1000 can only have one first electrode layer, for example the first electrode layer 112. For example, the first electrode layer 112 is disposed on the fourth insulation layer 109 of the display panel 1000, and the embodiment is not shown in the figures.

A difference of the embodiment from the embodiment as shown in FIG. 2 is that: the light shielding layer 102 is not disposed in the non-display region 20. the first electrode layer 112 is electrically connected to the second wire section 122 through the second via hole formed in the fourth insulation layer 109 and the fifth insulation layer 111. The first electrode layer 112 is electrically connected to the first wire section 121 through the first via hole formed in the fifth insulation layer 111, the fourth insulation layer 109, and the third insulation layer 107. In an embodiment, a difference of the embodiment from the embodiment as shown in FIG. 2 is that the embodiment further comprises: when the source and drain electrode layer 108 is manufactured, a thickness of the second metal layer coated on the third insulation layer 107 is greater than a thickness of the coated second metal layer form of the embodiment of FIG. 2. Other parts refer to the description of the embodiment as shown in FIG. 2 and are not repeated described here.

Figure 13:
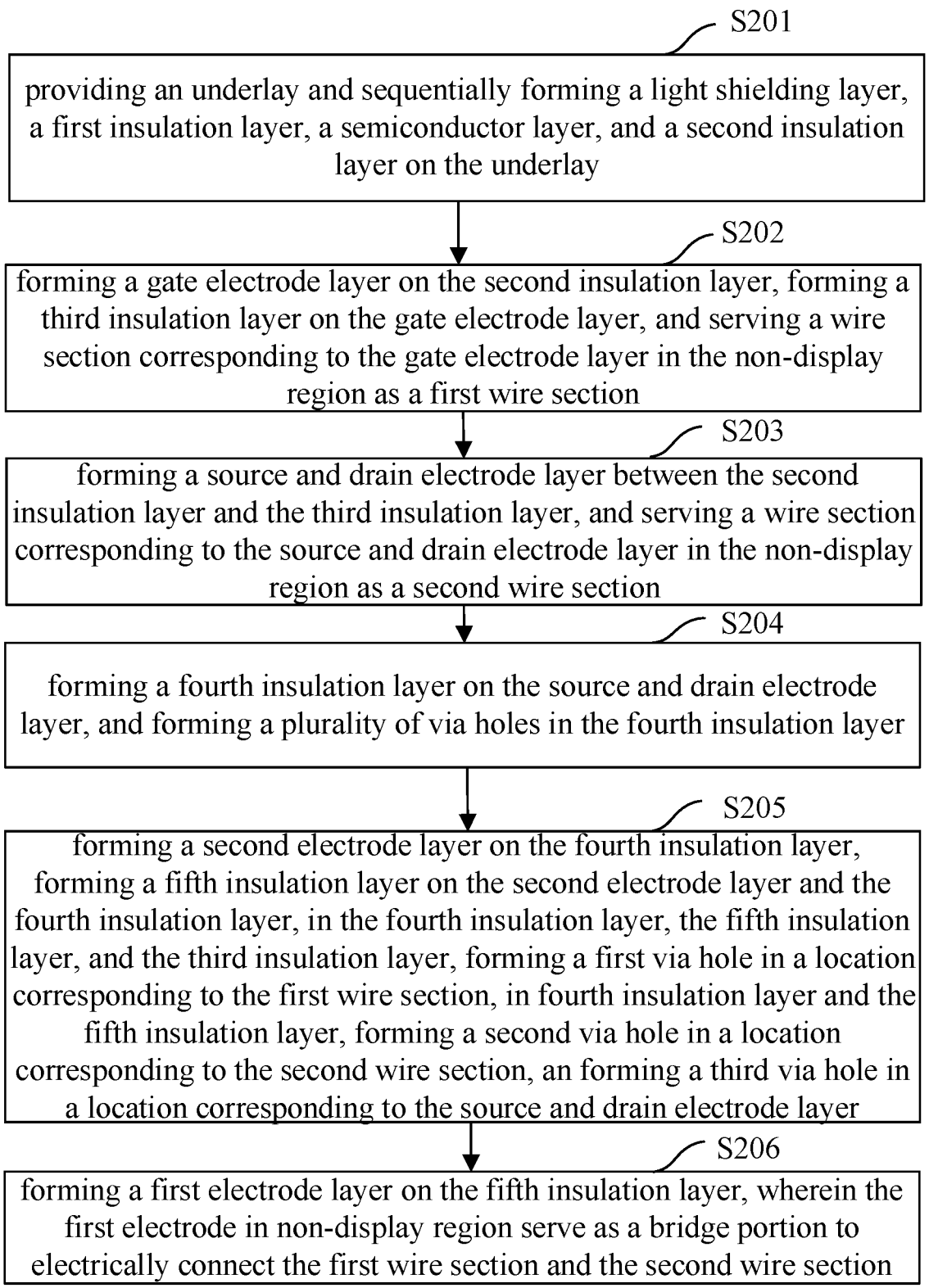
FIG. 13 is a second flow chart of a manufacturing method of the display panel provided by the embodiment of the present application.

FIG. 13 is a flow chart of a manufacturing method of the display panel provided by the embodiment of the present application. The display panel manufacturing method is configured to manufacture the display panel as shown in FIG. 8. The display panel manufacturing method comprises steps as follows.

A step S201 comprises providing an underlay and sequentially forming a light shielding layer, a first insulation layer, a semiconductor layer, and a second insulation layer on the underlay.

According to a conventional embodiment the light shielding layer 102, the first insulation layer 103, the semiconductor layer 104, and the second insulation layer 105 are formed sequentially on the underlay 101.

A step S202 comprises forming a gate electrode layer on the second insulation layer, forming a third insulation layer on the gate electrode layer, and serving a wire section corresponding to the gate electrode layer in the non-display region as a first wire section.

A first photoresist is coated on the second insulation layer 105 to form the first metal layer, and the first metal layer is photomasked, etched, and developed. A material of the first photoresist is the first metal material, the first metal material refers to the description as above and is not described repeatedly here. After photomasking, etching, and developing, the gate electrode layer 106 is formed. A wire section corresponding to the gate electrode layer 106 in the non-display region 20 serves as the first wire section 121. After the gate electrode layer 106 is formed, the third insulation layer 107 is formed on the gate electrode layer 106, specifically with reference to FIG. 9.

A step S203 comprises forming a source and drain electrode layer between the second insulation layer and the third insulation layer, and serving a wire section corresponding to the source and drain electrode layer in the non-display region as a second wire section.

Figure 9:
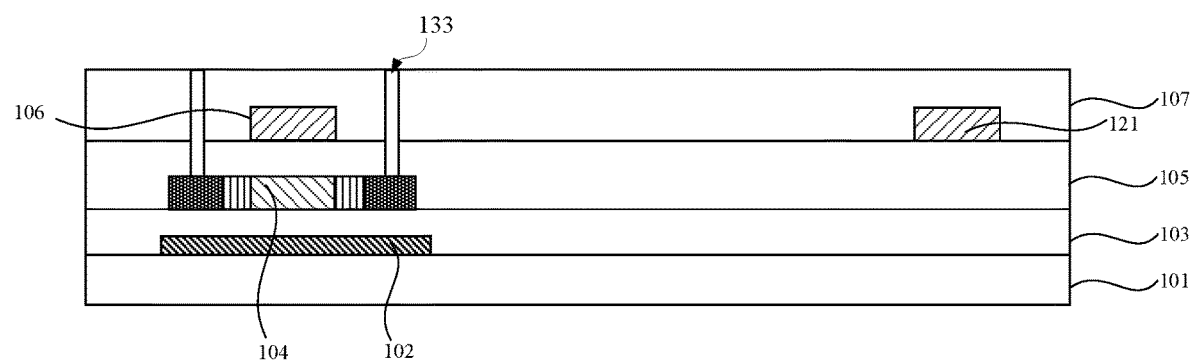
FIGS. 9 to 12 are schematic structural views of a second manufacturing process of the display panel provided by the embodiment of the present application.

The third via hole 133 is formed on the second insulation layer 105 and the third insulation layer 107, and the third via hole 133 is configured to form the source and drain electrode. Specifically, a via hole location (not shown) is formed on the third insulation layer 107 through a photomask, the second insulation layer 105 and the third insulation layer 107 corresponding to the via hole location are etched to form the third via hole 133, as shown in FIG. 9. After the third via hole 133 is formed, a second photoresist is coated on the third insulation layer 107 to form a second metal layer, the second metal layer is photomasked, etched, and developed to form the source and drain electrode layer 108 on the third insulation layer 107, specifically with reference to FIG. 10. A material of the second photoresist is a second metal material, the second metal material is filled in the third via hole 133.

In the non-display region 20, a wire section corresponding to the source and drain electrode layer 108 serves as the second wire section 122. Vertical projections of the first wire section 121 and the second wire section 122 do not coincide with each other. In some embodiments, the vertical projections of the first wire section 121 and the second wire section 122 can partially coincide with each other. No matter which circumstance is, with reference to FIG. 12, vertical projections of the first via hole 137 corresponding to the first wire section 121 and the second via hole 138 corresponding to the second wire section 122 cannot coincide with each other.

It should be noted that to prevent an issue of subsequent processes over etching the second wire section 122, during the process of the source and drain electrode layer, the thickness of the formed second metal layer is greater than the thickness of the second metal layer formed under the normal circumstance (in the embodiment shown in FIG. 2).

A step S204 comprises forming a fourth insulation layer on the source and drain electrode layer, and forming a plurality of via holes in the fourth insulation layer.

A via hole is formed in a location corresponding to the first wire section, a via hole is formed in a location corresponding to the second wire section, and a via hole is formed in a location corresponding to the source and drain electrode layer.

Figure 11:
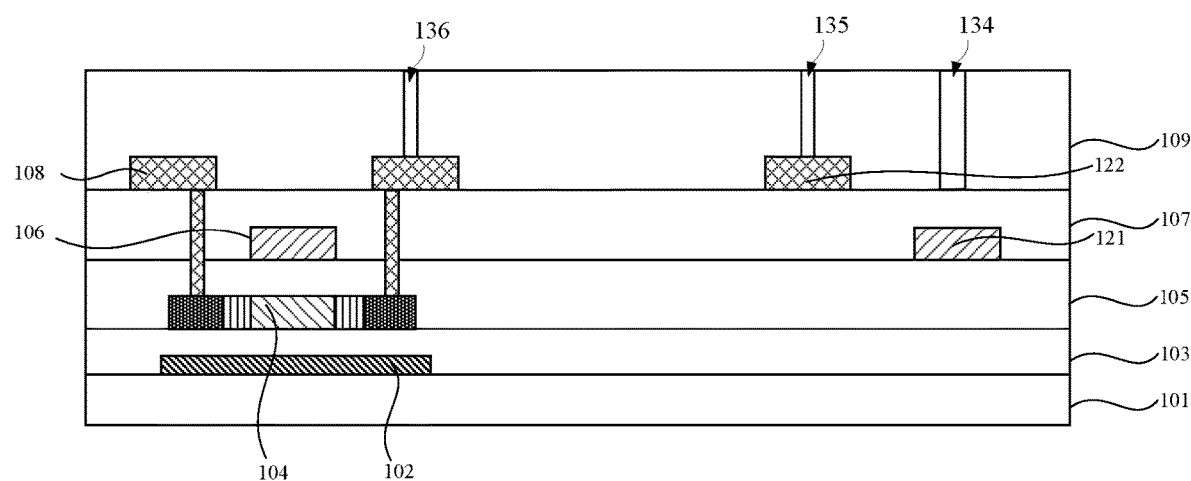

With reference to FIG. 11, the fourth insulation layer 109 is formed on the source and drain electrode layer 108, a plurality of via holes are formed in the fourth insulation layer 109, comprising a via hole 134 formed in a location corresponding to the first wire section 121, a via hole 135 formed in a location corresponding to the second wire section 122, and a via hole 136 formed in a location corresponding to the source and drain electrode layer.

A step S205 comprises forming a second electrode layer on the fourth insulation layer, forming a fifth insulation layer on the second electrode layer and the fourth insulation layer, in the fourth insulation layer, the fifth insulation layer, and the third insulation layer, forming a first via hole in a location corresponding to the first wire section, in fourth insulation layer and the fifth insulation layer, forming a second via hole in a location corresponding to the second wire section, an forming a third via hole in a location corresponding to the source and drain electrode layer.

Figure 12:
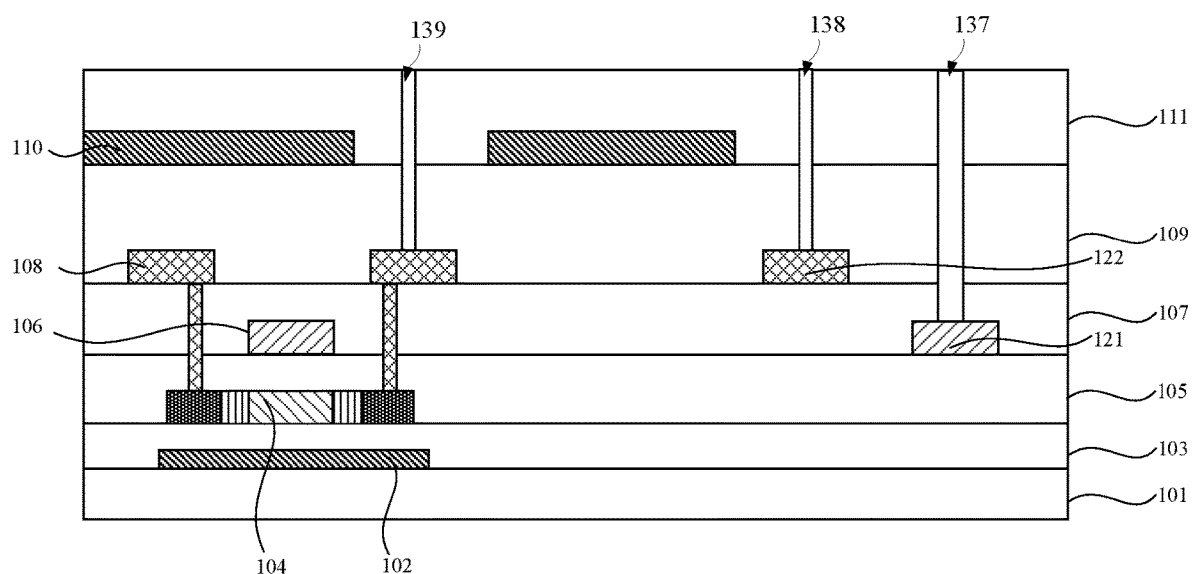

With reference to FIG. 12, the second electrode layer 110 is formed on the fourth insulation layer 109. The fifth insulation layer 111 is formed on the second electrode layer 110 and the fourth insulation layer 109. In the third insulation layer 107, the fourth insulation layer 109, and the fifth insulation layer 111, the first via hole 137 located adjacent to the first wire section 121 is formed in a location corresponding to the first wire section 121. In the fourth insulation layer 109 and the fifth insulation layer 111, the second via hole 138 located adjacent to the second wire section 122 is formed in a location corresponding to the second wire section 122. In the fourth insulation layer 109 and the fifth insulation layer 111, the via hole 139 located adjacent to the source and drain electrode layer is formed in a location corresponding to the source and drain electrode layer.

A step S206 comprises forming a first electrode layer on the fifth insulation layer, wherein the first electrode in non-display region serves as a bridge portion to electrically connect the first wire section and the second wire section.

With reference to FIG. 8, the first electrode layer 112 is formed on the fifth insulation layer 111. The first electrode of the first electrode layer 112 in the non-display region 20 serves as the bridge portion 123. The bridge portion 123 is electrically connected to the first wire section 121 through the first via hole 137. The bridge portion 123 is electrically connected to the second wire section 122 through the second via hole 138. The first electrode layer 112 is electrically connected to the source and drain electrode layer in the source and drain electrode layer 108 through the via hole 139.

As such, the display panel manufacturing method forms the display panel as shown in FIG. 8. The display panel formed by the display panel manufacturing method serves the first electrode in the non-display region 20 as the bridge portion 123 to electrically connect the first wire section 121 and the second wire section 122 through the bridge portion 123 to prevent over etching of the first wire section 121 when adaptor holes (including the first via hole and the second via hole) the of the adaptor portion 120, which prevents increase of the impedance of the first wire section 121 and the contact impedance between the first wire section 121 and the second wire section 122 and improves accuracy of data transmission of signal lines, and improves a performance of products of the display panel.

Figure 14:
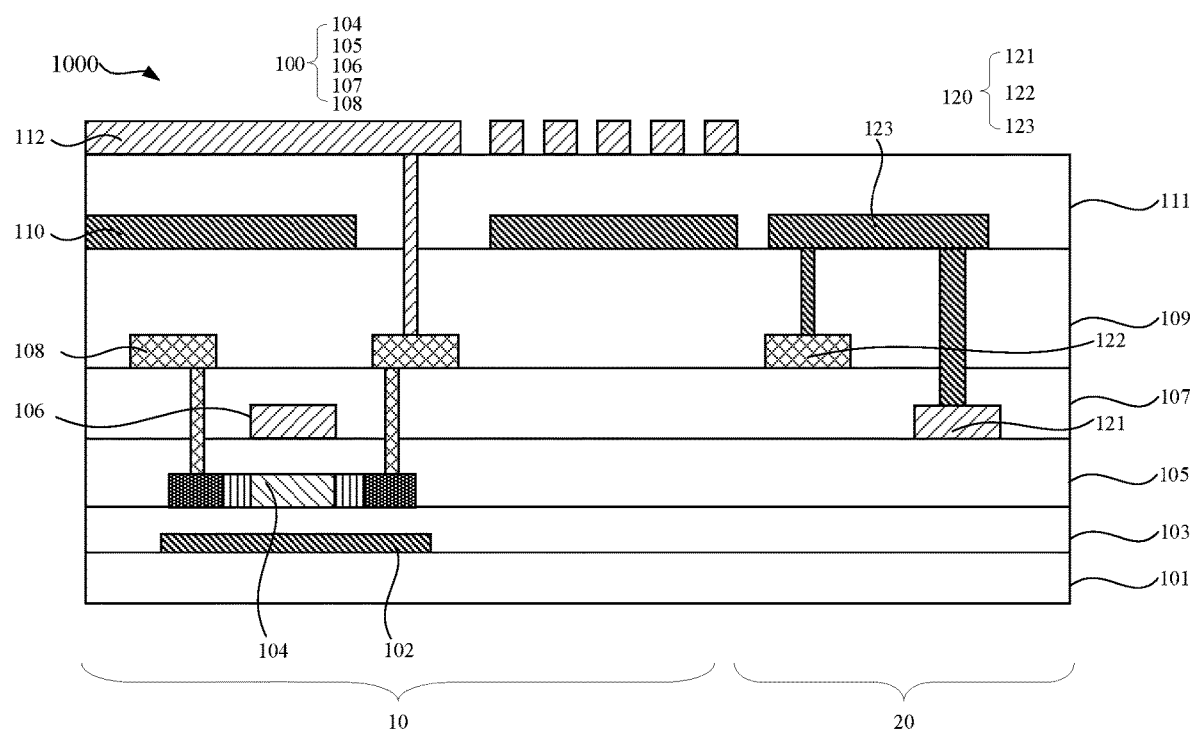
FIG. 14 is a third structural view of the display panel provided by the embodiment of the present application.

In an embodiment, with reference to FIG. 14, the display panel 1000 comprises the first electrode layer 112 located on the array driver layer 100 and the second electrode layer 110 located between the array driver layer 100 and the first electrode layer 112. The first electrode layer 112 is electrically connected to the source and drain electrode layer 108 of the array driver layer 100. The first electrode layer 112 is insulated from the second electrode layer 110. The bridge portion 123 and the second electrode layer 110 are disposed in a same layer. The bridge portion 123 is formed by a process for manufacturing the second electrode layer 110. Alternatively, it can be comprehended that when the second electrode layer 110 is manufactured, a second electrode is formed in the non-display region, the second electrode serves as the bridge portion 123. the embodiment serves the second electrode formed (above the adaptor holes) as the bridge portion 123 such that the bridge portion 123 is formed by a process for manufacturing the second electrode layer 110 to achieve electrical connection between the first wire section 121 and the second wire section 122 through the second electrode (the bridge portion 123) formed above the adaptor holes. Specifically, the first wire section 121 is electrically connected to the bridge portion 123 through the first via hole, and the second wire section 122 is electrically connected to the bridge portion 123 through the second via hole.

Specifically, with reference to FIG. 14, the display panel 1000 comprises the underlay 101, the light shielding layer 102, the first insulation layer 103, the semiconductor layer 104, the second insulation layer 105, the gate electrode layer 106, the third insulation layer 107, the source and drain electrode layer 108, the fourth insulation layer 109, the second electrode layer 110, the fifth insulation layer 111, and the first electrode layer 112 that are sequentially stacked on one another.

A difference of the embodiment from the embodiment as shown in FIG. 8 is that: The second electrode layer 110 is electrically connected to the second wire section 122 through the second via hole in the fourth insulation layer 109, the second electrode layer 110 is electrically connected to the first wire section 121 through the first via hole formed in the fourth insulation layer 109 和 the third insulation layer 107. Other parts are as described in the embodiment shown in FIG. 8 and is not described here repeatedly.

Figure 17:
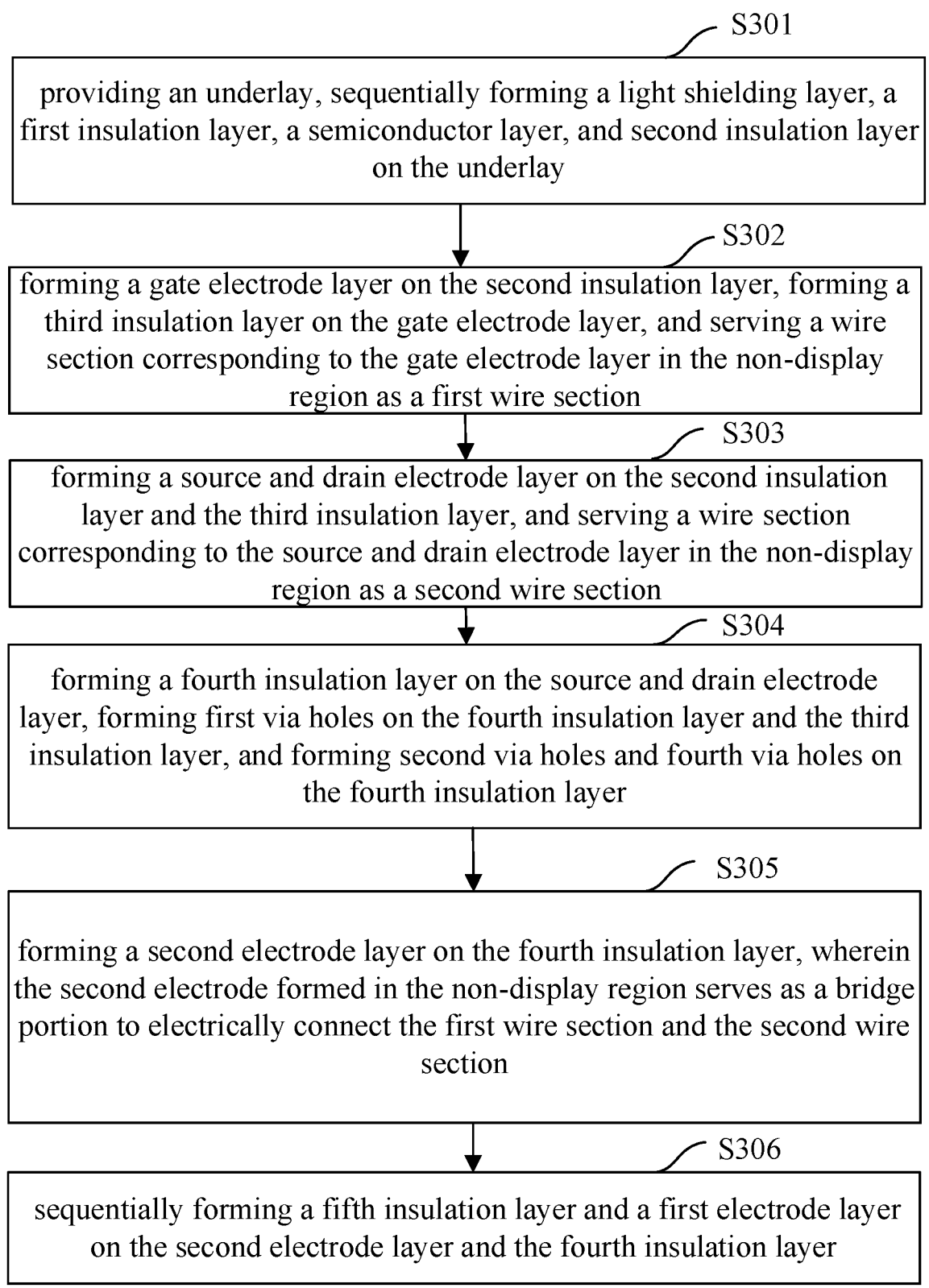
FIG. 17 is a third flow chart of a manufacturing method of the display panel provided by the embodiment of the present application.

FIG. 17 is a flow chart of a manufacturing method of the display panel provided by the embodiment of the present application. The display panel manufacturing method is configured to manufacture with the display panel as shown in FIG. 14. The display panel manufacturing method comprises steps as follows.

A step S301 comprises providing an underlay, sequentially forming a light shielding layer, a first insulation layer, a semiconductor layer, and second insulation layer on the underlay.

A step S302 comprises forming a gate electrode layer on the second insulation layer, forming a third insulation layer on the gate electrode layer, and serving a wire section corresponding to the gate electrode layer in the non-display region as a first wire section.

A step S303 comprises forming a source and drain electrode layer on the second insulation layer and the third insulation layer, and serving a wire section corresponding to the source and drain electrode layer in the non-display region as a second wire section.

Figure 10:
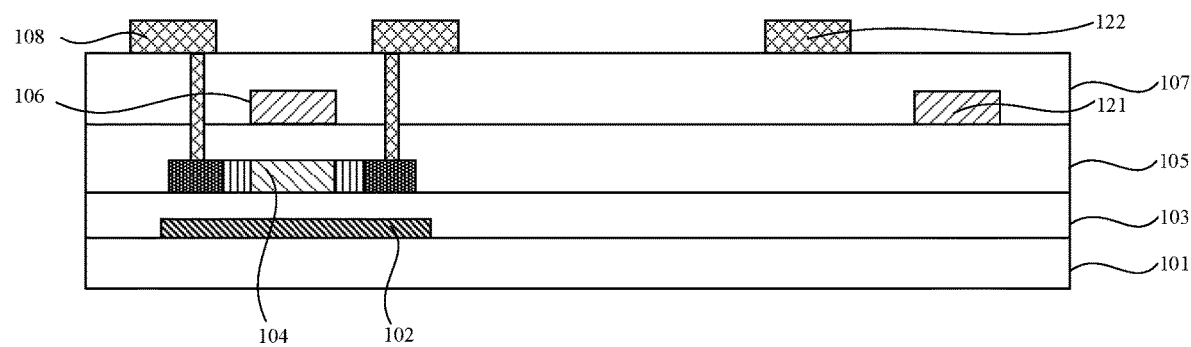

The underlay 101 and the light shielding layer 102, the first insulation layer 103, the semiconductor layer 104, the second insulation layer 105, the gate electrode layer 106, the third insulation layer 107, the source and drain electrode layer 108, the first wire section 121, and the second wire section 122 that are formed on the underlay 101, are as shown in FIGS. 9 and 10, and are not described repeatedly here.

A step S304 comprises forming a fourth insulation layer on the source and drain electrode layer, forming first via holes on the fourth insulation layer and the third insulation layer, and forming second via holes and fourth via holes on the fourth insulation layer.

Figure 15:
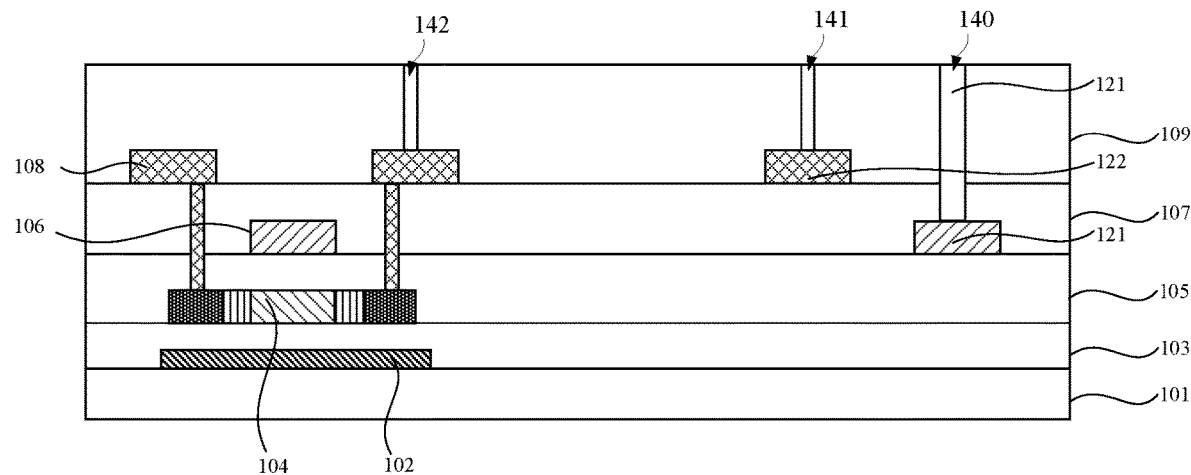
FIGS. 15 and 16 are schematic structural views of a second manufacturing process of the display panel provided by the embodiment of the present application.

With reference to FIG. 15, the fourth insulation layer 109 is formed on the source and drain electrode layer 108. Furthermore, the first via holes 140 reaching the first wire section 121 are formed in the fourth insulation layer 109 and the third insulation layer 107. The second via holes 141 reaching the second wire section 122 are formed in the fourth insulation layer 109. The fourth via holes 142 reaching the source and drain electrode layer are formed in the fourth insulation layer 109.

A step S305 comprises forming a second electrode layer on the fourth insulation layer, wherein the second electrode formed in the non-display region serves as a bridge portion to electrically connect the first wire section and the second wire section.

Figure 16:
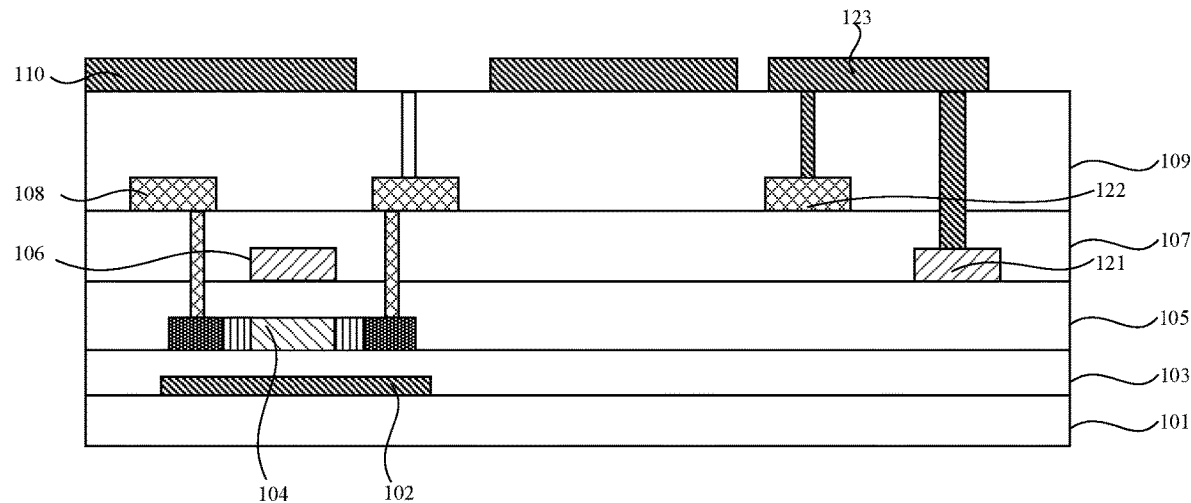

With reference to FIG. 16, the second electrode layer 110 is formed on the fourth insulation layer 109. The second electrode in the second electrode layer 110 in the non-display region 20 serves as the bridge portion 123. The bridge portion 123 is electrically connected to the first wire section 121 through the first via hole 140, and the bridge portion 123 is electrically connected to the second wire section 122 through the second via holes 141. the first electrode layer 112 is electrically connected to the source and drain electrode layer in the source and drain electrode layer 108 through the fourth via hole 142.

A step S306 comprises sequentially forming a fifth insulation layer and a first electrode layer on the second electrode layer and the fourth insulation layer.

As such, the display panel manufacturing method forms the display panel as shown in FIG. 14. The display panel formed by the display panel manufacturing method serves the second electrode in the non-display region 20 as the bridge portion 123, electrically connects the first wire section 121 and the second wire section 122 through the bridge portion 123 to prevent over etching of the first wire section 121 when the adaptor holes (including the first via hole and the second via hole) of the adaptor portion 120 are formed, which prevents increase of the impedance of the first wire section 121 and the contact impedance between the first wire section 121 and the second wire section 122 and improves accuracy of data transmission of signal lines, and improves a performance of products of the display panel.

Figure 18:
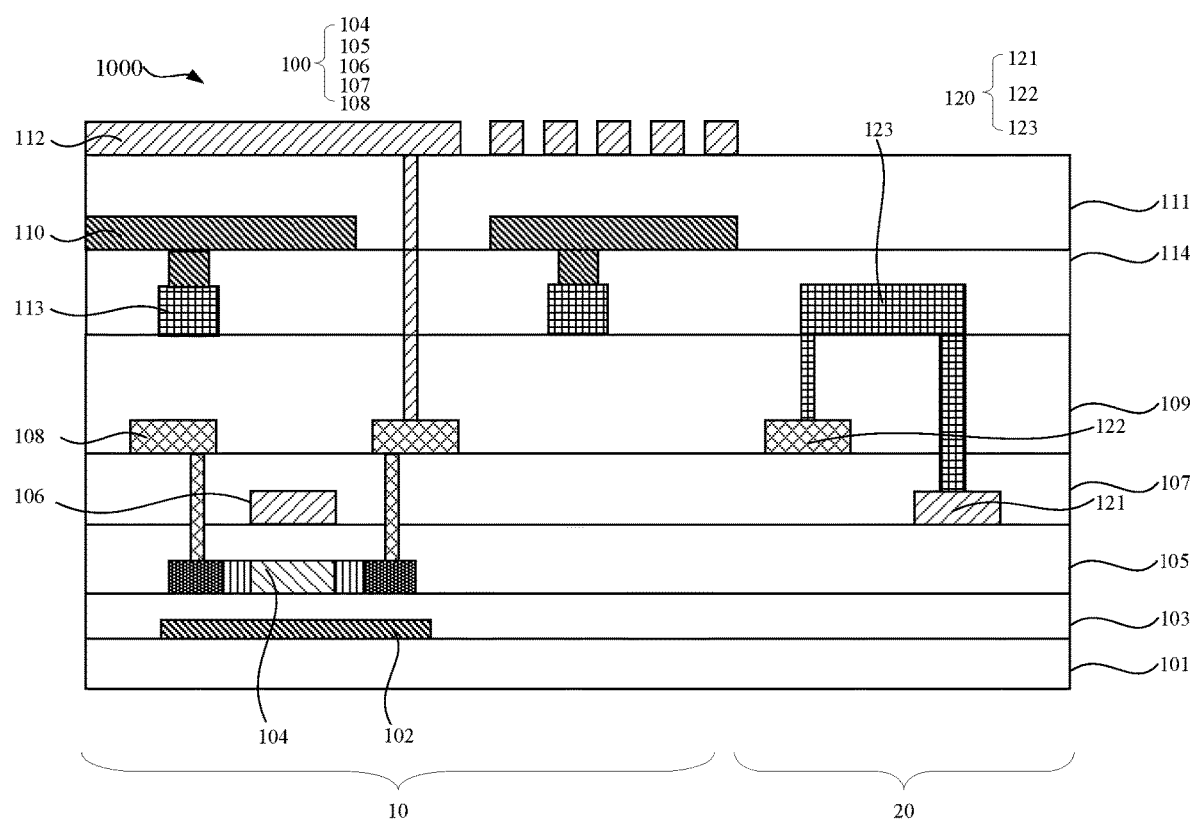
FIG. 18 is a fourth structural view of the display panel provided by the embodiment of the present application.

In an embodiment, with reference to FIG. 18, the display panel 1000 comprises the first electrode layer 112 located on the array driver layer 100, the second electrode layer 110 located between the array driver layer 100 and the first electrode layer 112, and a touch wiring layer 113 located between the array driver layer 100 and the second electrode layer 110. The first electrode layer 112 is electrically connected to the source and drain electrode layer 108. The first electrode layer 112 is insulated from the second electrode layer 110. The touch wiring layer 113 is electrically connected to the second electrode layer 110. The bridge portion 123 and the touch wiring layer 113 are disposed in a same layer. the bridge portion 123 is formed by a process manufacturing the touch wiring layer 113. Alternatively, it can be understood that, during manufacturing the touch wiring layer 113, the touch wiring layer is formed in the non-display region, and the touch wiring layer serves as the bridge portion 123. In the embodiment, the touch wiring layer (above the adaptor hole) serves as the bridge portion 123 such that the bridge portion 123 is formed by manufacturing the touch wiring layer 113, which achieves electrical connection of the first wire section 121 and the second wire section 122 through the touch wiring layer (the bridge portion 123) formed above the adaptor hole. Specifically, the first wire section 121 is electrically connected to the bridge portion 123 through the first via hole, and the second wire section 122 is electrically connected to the bridge portion 123 through the second via hole.

Specifically, with reference to FIG. 18, the display panel 1000 comprises the underlay 101, the light shielding layer 102, the first insulation layer 103, the semiconductor layer 104, the second insulation layer 105, the gate electrode layer 106, the third insulation layer 107, the source and drain electrode layer 108, the fourth insulation layer 109, the touch wiring layer 113, a sixth insulation layer 114, the second electrode layer 110, the fifth insulation layer 111, and the first electrode layer 112 sequentially stacked on one another.

A difference of the embodiment from the embodiment of FIG. 14 is that: the touch wiring layer 113 formed on the fourth insulation layer 109 and a sixth insulation layer 114 (interlayer insulation layer, IL) formed on the fourth insulation layer 109 and the touch wiring layer 113 are added. The touch wiring layer 113 in the non-display region 20 serves as the bridge portion 123. The bridge portion 123 is electrically connected to the second wire section 122 through the second via hole formed in the fourth insulation layer 109. The bridge portion 123 is electrically connected to the first wire section 121 through the first via holes formed in the fourth insulation layer 109 and the third insulation layer 107. The touch wiring layer 113 in the embodiment is electrically connected to the second electrode layer 110. The second electrode layer 110 in the embodiment does not dispose a corresponding second electrode in the non-display region 20. Other parts refer to descriptions of the embodiment as shown in FIG. 8 or 14, and are not repeatedly described here.

In the display panel manufacturing method as shown in FIG. 18, the steps of forming the underlay 101, the light shielding layer 102, the first insulation layer 103, the semiconductor layer 104, the second insulation layer 105, the gate electrode layer 106, the third insulation layer 107, the source and drain electrode layer 108, and the fourth insulation layer 109 are the same as those in FIG. 17. After the fourth insulation layer 109 is formed, the first via hole reaching the first wire section 121 is formed in the fourth insulation layer 109 and the third insulation layer 107. The second via hole reaching the second wire section 122 is formed in the fourth insulation layer 109. A via hole reaching the source and drain electrode layer 108 is formed in the fourth insulation layer 109. After the corresponding via hole is formed, the touch wiring layer 113 is formed on the fourth insulation layer 109. In the non-display region 20, the corresponding the touch wiring layer 113 serves as the bridge portion 123. The bridge portion 123 is electrically connected to the first wire section 121 through the first via hole and is electrically connected to the second wire section 122 through the second via hole. As such, the first wire section 121, the second wire section 122, and the bridge portion 123 form the adaptor portion 120. A sixth insulation layer 114 is formed on the touch wiring layer 113. A via hole is formed in the sixth insulation layer 114 in the display region 10 and corresponds to a location of the touch wiring layer 113. The second electrode layer 110 is formed on the sixth insulation layer 114. As such, the second electrode layer is electrically connected to the touch wiring layer 113 through the via hole formed in the sixth insulation layer 114. Other steps refer to the corresponding descriptions as above and are not described repeated here.

The embodiment serves the touch wiring layer in the non-display region 20 as the bridge portion 123, and electrically connect the first wire section 121 and the second wire section 122 through the bridge portion 123 to prevent over etching of the first wire section 121 when adaptor holes (including the first via hole and the second via hole) of the adaptor portion 120 are formed, which prevents increase of the impedance of the first wire section 121 and the contact impedance between the first wire section 121 and the second wire section 122 and improves accuracy of data transmission of signal lines, and improves a performance of products of the display panel.

In the above embodiment, the first wire section 121 is electrically connected to the bridge portion 123 through the connection metal in the first via hole, the second wire section 122 is electrically connected to the bridge portion 123 through the connection metal of the second via holes. The source and drain electrode layer 108 of the array driver layer 100 is electrically connected to the semiconductor layer 104 through the connection metal in the third via hole. A contact impedance of the connection metal in the third via hole is greater than a contact impedance of the connection metal in the first via hole or the connection metal in the second via hole.

Furthermore, after the third via hole is processed by hydrofluoric acid, an impedance of an inclined surface of the third via hole is lowered such that the impedance of the inclined surface of the third via hole is less than the impedances of inclined surfaces first via hole and the second via hole to improve a performance of the switch thin film transistor.

In an embodiment, the adaptor portion 120 of all of the embodiments as above comprises at least two first via holes and at least two second via holes. The at least two first via holes are connected in parallel, and the at least two second via holes are connected in parallel. The first wire section 121 is electrically connected to the bridge portion 123 through the at least two first via holes. The second wire section 122 is electrically connected to the bridge portion 123 through the at least two via holes. As such, the two first via holes connected in parallel lower a contact impedance of the two first via holes. Similarly, the two second via holes connected in parallel lower a contact impedance of the two second via holes. Therefore, a total impedance of the gate electrode layer 106 is lowered to improve a charge rate of the display panel.

Figure 19:
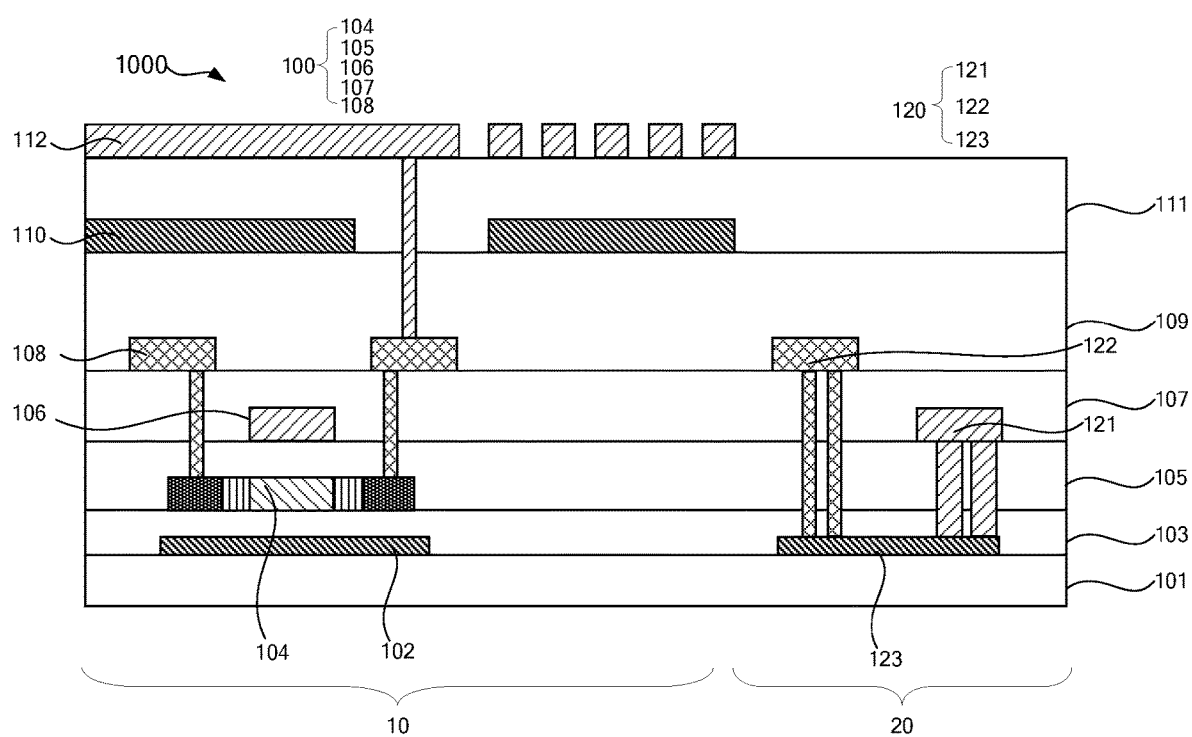
FIG. 19 is a fifth structural view of the display panel provided by the embodiment of the present application.

One of the embodiments above is taken as an example for explanation, as shown in FIG. 19. adaptor portion 120 comprises two first via holes and two second via holes. The two first via holes are connected in parallel, and the two second via holes are connected in parallel. The first wire section 121 is electrically connected to the bridge portion 123 through the two first via holes. The second wire section 122 is electrically connected to the bridge portion 123 through the two via hole.

The embodiment of the present application also provides an electrical terminal comprising a display panel and a terminal main body. The display panel is installed in the terminal main body, and is assembled with the display panel as a whole. The display panel is the display panel 1000 of any one of the above embodiments and specifically refers to the descriptions as above, and is not repeatedly described here. The terminal main body comprises a memory and a processor. In an embodiment, the terminal main body can further comprise one or more of input circuit, radio frequency unit, sensor, audio frequency circuit, speaker, transmission module, and Bluetooth.

In the above-mentioned embodiments, the descriptions of the various embodiments are focused. For the details of the embodiments not described, reference may be made to the related descriptions of the other embodiments.

The display panel, and the electrical terminal provided by the embodiment of the present application are described in detail as above. The principles and implementations of the present application are described in the following by using specific examples. The description of the above embodiments is only for assisting understanding of the technical solutions of the present application and the core ideas thereof. Those of ordinary skill in the art should understand that they can still modify the technical solutions described in the foregoing embodiments are or equivalently replace some of the technical features. These modifications or replacements do not depart from the essence of the technical solutions of the embodiments of the present application.

What is claimed is:

1. A display panel, wherein the display panel comprises a display region and a non-display region located on a periphery of the display region; wherein the display panel comprises:
   an underlay;
   an array driver layer located on the underlay and comprising a gate electrode layer and a source and drain electrode layer; and
   a signal line comprising an adaptor portion located in the non-display region, wherein the adaptor portion comprises a first wire section disposed in a same layer with the gate electrode layer, a second wire section disposed in a same layer with the source and drain electrode layer, and a bridge portion electrically connected to the first wire section and the second wire section;
   wherein the first wire section, the second wire section, and the bridge portion are disposed in different layers;
   wherein the adaptor portion further comprises a first via hole and a second via hole, the first wire section is electrically connected to the bridge portion through a connection metal in the first via hole, and the second wire section is electrically connected to the bridge portion through a connection metal in the second via hole;
   wherein the array driver layer further comprises a semiconductor layer, the source and drain electrode layer of the array driver layer is electrically connected to the semiconductor layer through a connection metal in a third via hole, a contact impedance of the connection metal in the third via hole is greater than a contact impedance of the connection metal in the first via hole or the connection metal in the second via hole.

2. The display panel according to claim 1, wherein the display panel further comprises metal layers located on two sides of the array driver layer, and the bridge portion and at least one of the metal layers are disposed in a same layer.

3. The display panel according to claim 2, wherein the display panel comprises a light shielding layer located between the underlay and the array driver layer, the bridge portion and the light shielding layer are disposed in a same layer, the interlayer insulation layer between the first wire section and the second wire section completely covers the first wire section, and an ability of hydrofluoric acid corrosion resistance of the light shielding layer is greater than an ability of hydrofluoric acid corrosion resistance of the gate electrode layer.

4. The display panel according to claim 2, wherein the display panel comprises a first electrode layer located on the array driver layer, and the first electrode layer is electrically connected to the source and drain electrode layer;
   wherein the bridge portion and the first electrode layer are disposed in same layer.

5. The display panel according to claim 2, wherein the display panel comprises a first electrode layer located on the array driver layer and a second electrode layer located between the array driver layer and the first electrode layer, the first electrode layer is electrically connected to the source and drain electrode layer, and the first electrode layer is insulated from the second electrode layer;
   wherein the bridge portion and the second electrode layer are disposed in a same layer.

6. The display panel according to claim 2, wherein the display panel comprises a first electrode layer located on the array driver layer, a second electrode layer located between the array driver layer and the first electrode layer, and a touch wiring layer located between the array driver layer and the second electrode layer, the first electrode layer is electrically connected to the source and drain electrode layer, the first electrode layer is insulated from the second electrode layer, and the touch wiring layer is electrically connected to the second electrode layer;
   wherein the bridge portion and the touch wiring layer are disposed in a same layer.

7. The display panel according to claim 1, wherein the adaptor portion comprises at least two first via holes and at least two second via holes, the at least two first via holes are connected in parallel, the at least two second via holes are connected in parallel.

8. The display panel according to claim 1, wherein a material of the first wire section comprises an alloy material or a lamination metal film multi-layer.

9. The display panel according to claim 8, wherein the alloy material comprises aluminum alloy, tungsten alloy, copper alloy, silver alloy, and zinc alloy, and the lamination metal film multi-layer comprises an aluminum lamination layer, a tungsten lamination layer, a copper lamination layer, a silver lamination layer, and a zinc lamination layer.

10. An electrical terminal, comprising a display panel and a terminal main body, the display panel is installed in the terminal main body; the display panel comprising a display region and a non-display region located on a periphery of the display region; wherein the display panel comprises:
    an underlay;
    an array driver layer located on the underlay and comprising a gate electrode layer and a source and drain electrode layer; and a signal line comprising an adaptor portion located in the non-display region, wherein the adaptor portion comprises a first wire section disposed in a same layer with the gate electrode layer, a second wire section disposed in a same layer with the source and drain electrode layer, and a bridge portion electrically connected to the first wire section and the second wire section;

wherein the first wire section, the second wire section, and the bridge portion are disposed in different layers;

wherein the adaptor portion further comprises a first via hole and a second via hole, the first wire section is electrically connected to the bridge portion through a connection metal in the first via hole, and the second wire section is electrically connected to the bridge portion through a connection metal in the second via hole;

wherein the array driver layer further comprises a semiconductor layer, the source and drain electrode layer of the array driver layer is electrically connected to the semiconductor layer through a connection metal in a third via hole, a contact impedance of the connection metal in the third via hole is greater than a contact impedance of the connection metal in the first via hole or the connection metal in the second via holes.

11. The electrical terminal according to claim 10, wherein the display panel further comprises metal layers located on two sides of the array driver layer, and the bridge portion and at least one of the metal layers are disposed in a same layer.

12. The electrical terminal according to claim 11, wherein the display panel comprises a light shielding layer located between the underlay and the array driver layer, the bridge portion and the light shielding layer are disposed in a same layer, the interlayer insulation layer between the first wire section and the second wire section completely covers the first wire section, and an ability of hydrofluoric acid corrosion resistance of the light shielding layer is greater than an ability of hydrofluoric acid corrosion resistance of the gate electrode layer.

13. The electrical terminal according to claim 11, wherein the display panel comprises a first electrode layer located on the array driver layer, and the first electrode layer is electrically connected to the source and drain electrode layer;

wherein the bridge portion and the first electrode layer are disposed in same layer.

14. The electrical terminal according to claim 11, wherein the display panel comprises a first electrode layer located on the array driver layer and a second electrode layer located between the array driver layer and the first electrode layer, the first electrode layer is electrically connected to the source and drain electrode layer, and the first electrode layer is insulated from the second electrode layer;

wherein the bridge portion and the second electrode layer are disposed in a same layer.

15. The electrical terminal according to claim 11, wherein the display panel comprises a first electrode layer located on the array driver layer, a second electrode layer located between the array driver layer and the first electrode layer, and a touch wiring layer located between the array driver layer and the second electrode layer, the first electrode layer is electrically connected to the source and drain electrode layer, the first electrode layer is insulated from the second electrode layer, and the touch wiring layer is electrically connected to the second electrode layer;

wherein the bridge portion and the touch wiring layer are disposed in a same layer.

16. The electrical terminal according to claim 10, wherein the adaptor portion comprises at least two first via holes and at least two second via holes, the at least two first via holes are connected in parallel, the at least two second via holes are connected in parallel.

17. The electrical terminal according to claim 10, wherein a material of the first wire section comprises an alloy material or a lamination metal film multi-layer.

18. The electrical terminal according to claim 17, wherein the alloy material comprises aluminum alloy, tungsten alloy, copper alloy, silver alloy, and zinc alloy, and the lamination metal film multi-layer comprises an aluminum lamination layer, a tungsten lamination layer, a copper lamination layer, a silver lamination layer, and a zinc lamination layer.

19. A display panel, wherein the display panel comprises a display region and a non-display region located on a periphery of the display region; wherein the display panel comprises:

an underlay;

an array driver layer located on the underlay and comprising a gate electrode layer and a source and drain electrode layer; and a signal line comprising an adaptor portion located in the non-display region, wherein the adaptor portion comprises a first wire section disposed in a same layer with the gate electrode layer, a second wire section disposed in a same layer with the source and drain electrode layer, and a bridge portion electrically connected to the first wire section and the second wire section;

wherein the first wire section, the second wire section, and the bridge portion are disposed in different layers;

wherein the display panel further comprises metal layers located on two sides of the array driver layer, and the bridge portion and at least one of the metal layers are disposed in a same layer;

wherein the display panel comprises a first electrode layer located on the array driver layer and a second electrode layer located between the array driver layer and the first electrode layer, the first electrode layer is electrically connected to the source and drain electrode layer, and the first electrode layer is insulated from the second electrode layer;

wherein the bridge portion and the second electrode layer are disposed in a same layer.

20. The display panel according to claim 19, wherein the display panel comprises a light shielding layer located between the underlay and the array driver layer, the bridge portion and the light shielding layer are disposed in a same layer, the interlayer insulation layer between the first wire section and the second wire section completely covers the first wire section, and an ability of hydrofluoric acid corrosion resistance of the light shielding layer is greater than an ability of hydrofluoric acid corrosion resistance of the gate electrode layer.

* * * * *